United States Patent [19]

Ohorodnik et al.

[11] 3,864,281

[45] Feb. 4, 1975

[54] PROCESS FOR THE MANUFACTURE OF A DEHALOGENATION CATALYST

[75] Inventors: Alexander Ohorodnik, Erftstadt Liblar; Klaus Gehrmann; Joachim Hundeck, both of Hurth-Knapsack; Hermann Vierling, Hurth, all of Germany

[73] Assignee: Hoechst Aktiengesellschaft, Frankfurt/Main, Germany

[22] Filed: Aug. 13, 1973

[21] Appl. No.: 387,755

[30] Foreign Application Priority Data
Aug. 17, 1972 Germany............................ 2240466

[52] U.S. Cl.................. 252/447, 252/420, 252/460
[51] Int. Cl............................................. B01j 11/08
[58] Field of Search.................... 252/447, 460, 420; 260/439 A

[56] References Cited
UNITED STATES PATENTS

| | | | |
|---|---|---|---|
| 2,823,235 | 2/1958 | Graham et al. ................. | 252/447 X |
| 2,863,917 | 12/1958 | Rucker et al. .................. | 252/420 X |
| 2,917,546 | 12/1959 | Gordon et al. .................. | 252/447 X |
| 3,127,356 | 3/1964 | Hamilton et al. ................... | 252/447 |
| 3,641,121 | 2/1972 | Swift .............................. | 252/460 X |
| 3,736,266 | 5/1973 | Schrage ............................ | 252/447 |

FOREIGN PATENTS OR APPLICATIONS
202,349   7/1956   Australia

*Primary Examiner*—H. Sneed
*Attorney, Agent, or Firm*—Connolly & Hutz

[57] ABSTRACT

Production of a catalyst comprised of a fine-particulate carrier and palladium metal for the partial dehalogenation of di- and/or trichloracetic acids in the presence of hydrogen to produce monochloracetic acid, wherein the dry porous carrier is impregnated with a palladium salt solution and the palladium absorbed by the carrier is reduced to palladium metal with the use of a suitable reducing agent. More particularly the palladium metal is concentrated exclusively on the surface of the carrier by impregnating and partially saturating the dry, fine-particulate carrier with the pure palladium salt solvent; by continuing impregnation until complete saturation of the carrier so pretreated with the necessary quantity of palladium salt solution; and by reducing the palladium salt applied to the carrier to palladium in known manner.

8 Claims, No Drawings

PROCESS FOR THE MANUFACTURE OF A DEHALOGENATION CATALYST

The present invention relates to the production of a dehalogenation catalyst comprised of a carrier and palladium metal being exclusively concentrated on the surface of the carrier.

It has already been reported that crude monochloracetic acid, for example, can be freed from di- and trichloroacetic acid by-products by selectively transforming the latter into monochloracetic acid in the presence of hydrogen and in contact with a palladium catalyst. This has been described in German Patent Specification Nos. 1 072 980 and 1 201 326, in German published Specification "Offenlegungsschrift" 1 816 931, and in U.S. Pat. No. 2 863 917.

Noble metal catalysts are known to be commercially expensive materials which more particularly handicap economic operation in all those cases in which the noble metal is merely used for purifying a commercial product, for example crude monochloracetic acid. It is therefore highly desirable to have processes permitting use to be made of minimized quantities of catalyst. Such process has already been described in German published Specification "Offenlegungsschrift" 1 816 931, wherein a crude product obtained by chlorinating acetic acid to give monochloracetic acid is purified by subjecting undesirable by-products to catalytic dehalogenation with hydrogen in liquid phase and in contact with a fine-particulate fluid bed catalyst consisting of palladium metal and a carrier, such as silicic acid or active carbon.

The above fluid bed catalyst is produced, for example, by homogeneously impregnating fine-particulate porous silicic acid with a palladium salt solution and reducing then the palladium salt to palladium metal with the use of an aqueous ammoniacal hydrazine solution. In this carrier-supported catalyst, the palladium is distributed over the surface area and within the interior of the porous carrier.

We have now discovered that it is the palladium concentration on the carrier surface area which critically determines catalyst activity, whilst this can scarcely be said of palladium which is present in the interior of the carrier. The challenge has therefore been to provide a fine-particulate carrier-supported catalyst, wherein the palladium is exclusively concentrated on the surface of the individual carrier particles, whereby to improve catalyst activity as compared with that of known catalysts, and to effect noble metal savings. Known processes, for example spraying a noble metal on to a carrier have been found unsuitable or commercially unattractive in the present case because of the minor mean particle size (about 100 microns) of the carrier.

The present invention now provides a process for making a catalyst comprised of a fine-particulate carrier and palladium metal for the partial dehalogenation of di- and/or trichloracetic acids in the presence of hydrogen to produce monochloracetic acid, wherein the dry porous carrier is impregnated with a palladium salt solution and the palladium absorbed by the carrier is reduced to palladium metal with the use of a suitable reducing agent, the present process comprising concentrating the palladium metal exclusively on the surface of the carrier by impregnating and partially saturating the dry, fine-particulate carrier with the pure palladium salt solvent; by continuing impregnation until complete saturation of the carrier so pretreated with the necessary quantity of palladium salt solution; and by reducing the palladium salt applied to the carrier to palladium in known manner.

The carrier used in the process of the present invention commonly has a BET-surface area between about 10 and 800 square meters/gram, preferably between 100 and 500 square meters/gram, which is determined by the method developed and described by Brunauer, Emmet and Teller in J. Am. Chem. Soc. volume 60 (1938); pages 309–319.

Further parameters defining the carrier are its volume of pores and its particle size. In the present invention, use should conveniently be made of a carrier having a volume of pores between about 0.1 and 1.8 milliliters/gram, preferably between 0.8 and 1.2 milliliters/gram, and a mean particle size between 10 and 800 microns, preferably about 100 microns.

The useful carrier materials include silicic acid and active carbon, for example. For reasons of economy, the carrier should commonly be pretreated, i.e., partially saturated, with water. Water is also used as the solvent for the palladium salts, which preferably include palladium chloride and palladium acetate.

A further embodiment of the present invention comprises saturating the carrier with the pure solvent up to a degree between about 50 and 80 percent. It is possible for the quantity of palladium, which is to be applied on to the carrier, to be varied by varying the concentration of the palladium salt in the solvent, the carrier having normally between about 0.1 and 10 weight percent, preferably between 0.2 and 1 weight percent, of palladium deposited thereon.

The following statements are intended further to describe the process of the present invention.

The essential feature of the present process resides in the two-step saturation of the carrier with solvent. It is accordingly necessary, prior to effecting the present process, to determine the carrier's power for absorbing solvent, this making it possible for the overall quantity of solvent needed to be used in proportionate shares in the individual saturation steps.

To determine the carrier's maximum power for absorbing liquids, a certain quantity of carrier, for example silicic acid, is admixed with agitation with the quantity of solvent necessary to reach the limit of saturation, where the individual catalyst particles just fail to cake together or to adhere to the wall of the container. The result in kg of solvent per kg of carrier is the basis underlying calculation of the quantities of solvent to be used for preliminary saturation and complete saturation.

For example, if the liquids absorption power is 1 kg of liquid per kg of carrier, the carrier is presaturated with between 50 and 80 weight pecent or with between 500 and 800 grams of water. As a result, palladium salt is prevented, during the impregnation of the carrier which follows, from penetrating into the interior of the catalyst, where it is practically catalytically inactive. In those cases in which it is desirable to have a catalyst containing as little as 0.5 weight percent of Pd, for example, it is advantageous to establish a high degree of preliminary saturation, for example of about 80 percent. Needless to say it is possible for the degree of preliminary saturation to be reduced in all those cases in which it is desirable to have a catalyst containing more Pd.

The presaturated carrier is impregnated with agitation with a palladium salt solution, preferably a PdCl$_2$-solution, the quantity of solution and the concentration of Pd therein being so selected that the resulting final catalyst has the desirable concentration of Pd, for a 100 percent saturation of the carrier.

The carrier impregnated with Pd-salt is reduced at once by means of an alkaline hydrazine solution, in which it is allowed to remain for a period between about 10 and 20 minutes to ensure reduction of Pd-salt, which may be present in the interior of carrier particles. The catalyst is then filtered off and washed until neutral. The final catalyst need normally not be dried.

Investigations made with a microprobe on the catalyst of the present invention have shown an almost exclusive palladium concentration in the peripheral areas of the individual catalyst particles.

The catalysts produced in accordance with the present invention are particularly well adapted for use in decontamination processes, such as that described in German published Specification "Offenlegungsschrift" 1 816 931. As compared with similar prior art catalysts, those of the present invention have an improved activity under otherwise identical conditions and for identical quantities of noble metal therein.

The following Examples further illustrate the process of the present invention and demonstrate that the present catalysts compare favorably with prior art catalysts.

EXAMPLE 1 a. Determination of solvent absorbed by carrier 1 kg of a dry porous silicic acid carrier, which had a BET-surface area of 360 square meters/gram, a volume of pores of 1.2 milliliters/gram and the following particle size distribution

| | |
|---|---|
| 315 microns | 1.2 weight % |
| 200 microns | 10.3 weight % |
| 100 microns | 83.0 weight % |
| 63 microns | 5.1 weight % |
| 40 microns | 0.4 weight % | was mixed with thorough agitation with water until saturate therewith. This was the case once individual catalyst particles commenced caking together. In the present Example, 1200 grams of water were necessary to saturate 1 kg of carrier.

b. Catalyst preparation 15 kg of the dry silicic acid carrier tested as described under a) above were thoroughly mixed for 10 to 20 minutes in a kneader with 9 kg of water; this corresponded to a preliminary saturation degree of 50 percent. Mixing was continued and 5.3 kg of a 4.25 weight percent palladium chloride solution were gradually added to the pretreated carrier. After a further mixing time of 10–20 minutes, the carrier was completely coated with palladium chloride. The carrier with the PdCl$_2$ thereon was then introduced, with agitation, into a solution of 0.75 kg of hydrazine and 0.40 kg of ammonia in 75 kg of water, and the palladium salt on the carrier was reduced at once to metal. To complete the reduction, the catalyst was allowed to remain in the alkaline hydrazine solution for 10–20 minutes, while stirring was continued. The catalyst was then separated, washed until neutral and packed while moist.

The Pd-salt can also be reduced with hydrogen or gaseous CO in the gas phase. This, however, with higher expenditure of machinery as it is necessary for the catalyst to be dried and for the reduction to be effected at high temperatures. In addition thereto, corrosive off-gas is evolved.

The catalyst so made was found to contain 0.9 weight percent of palladium, based on the dry carrier. The method used for making the catalyst could not be found to cause loss of palladium.

Investigations made with a microprobe on the catalyst showed palladium concentration predominantly on the surface area of the individual catalyst particles.

EXAMPLE 2 a. Determination of solvent absorbed by carrier 1 kg of a dry silicic acid carrier, which had a BET-surface area of 405 square meters/gram, a volume of pores of 1.1 milliliters/gram and the following particle size distribution

| | |
|---|---|
| 315 microns | 0.3 weight % |
| 200 microns | 0.4 weight % |
| 100 microns | 25.6 weight % |
| 63 microns | 59.1 weight % |
| 40 microns | 14.6 weight % | was saturated, with thorough agitation, with water in the manner described in Example 1. 1.1 kg of water were needed per kg of carrier.

b. Catalyst preparation 15 kg of the carrier tested as described under 2a) above were mixed for a period between 10 and 20 minutes with 13.2 kg of water, corresponding to a degree of preliminary saturation of 80 percent. under the conditions reported in Example 1, the carrier so treated with solvent was admixed with 3.3 kg of a 3.80 weight percent solution of palladium chloride, the PdCl$_2$ was reduced by means of a solution of 0.42 kg of hydrazine and 0.23 kg of ammonia in 75 kg of water, and the catalyst was further treated under the conditions of Example 1.

The final catalyst contained 0.5 weight percent of Pd, based on the dry carrier.

Investigations made with a microprobe showed high palladium concentration on the surface of the catalyst particles.

The catalyst so made had a metal surface area of 0.5 square meter/gram of Pd for a Pd-content of 0.5 weight percent.

EXAMPLE 3 (Comparative Example)

15 kg of a dry silicic acid carrier which had a BET-surface area of 405 square meters/gram, a volume of pores of 1.1 milliliters/gram and the following particle size distribution

| | |
|---|---|
| 315 microns | 0.3 weight % |
| 200 microns | 0.4 weight % |
| 100 microns | 25.6 weight % |
| 63 microns | 59.1 weight % |
| 40 microns | 14.6 weight % | were thoroughly mixed for 30 minutes in a kneader with 16.61 kg of a 0.7 weight percent solution of PdCl$_2$. The carrier coated with PdCl$_2$ was then introduced with agitation into a solution of 0.75 kg of hydrazine and 0.40 kg of ammonia in 75 kg of water, the palladium salt on the carrier being reduced at once to metal. To complete the reduction, the catalyst was allowed to remain in the alkaline hydrazine solution for a period between 10 and 20 minutes. The catalyst was then separated, washed until neutral and packed while moist. The catalyst so made contained 0.5 weight of Pd, based on the dry carrier.

EXAMPLE 4

20 grams of the prior art catalyst, which was prepared in the manner described in Example 3 and contained 0.5 weight percent of Pd (catalyst A), and 20 grams of the catalyst of the present invention, which was prepared in the manner described in Example 2 and equally contained 0.5 weight percent of Pd (catalyst b), respectively, were used for purifying monochloracetic acid in accordance with the process described in German published Specification "Offenlegungsschrift; 1 816 931.

The operational conditions used and the test results obtained are indicated in the following Table.

TABLE

| Catalyst | | A | B |
|---|---|---|---|
| Catalyst quantity | Grams | 20 | 20 |
| Pd-content | Weight % | 0.5 | 0.5 |
| Quantity of crude monochloracetic acid (MCE) used | Grams | 220 | 220 |
| Dichloracetic acid contained in crude acid | % | 7.1 | 7.1 |
| Reaction temperature | °C | 120 | 120 |
| $H_2$-throughput | liters/h | 50 | 50 |
| Dichloracetic acid conversion after 2 hours | % | 66 | 92 |
| Residual content of dichloracetic acid in monochloracetic acid (MCE) after 2 hours | Weight % | 2.40 | 0.55 |

The above Table shows that catalyst B (invention) compares favorably with catalyst A (prior art catalyst). Catalyst B produces higher space/time yields and is accordingly more active than comparative catalyst A.

We claim:

1. In the process for the manufacture of a catalyst comprised of a fine-particulate carrier and palladium metal for the partial dehalogenation of di- and/or trichloracetic acids in the presence of hydrogen to produce monochloroacetic acid, wherein the dry porous carrier is impregnated with a palladium salt solution and the palladium absorbed by the carrier is reduced to palladium metal with the use of a suitable reducing agent, the improvement comprising concentrating the palladium metal exclusively on the surface of a silicic acid or active carbon carrier having a BET-surface area between about 10 and 800 square meters/gram, a volume of pores between about 0.1 and 1.8 milliliters/gram and a mean particle size between about 10 and 800 microns by impregnating and partially saturating the dry, fine-particulate carrier with water; by continuing impregnation until complete saturation of the carrier so pretreated with the necessary quantity of an aqueous palladium salt solution; and by reducing the palladium salt applied to the carrier to palladium in known manner.

2. The process as claimed in claim 1, wherein the carrier has a BET-surface area between 100 and 500 square meters/gram.

3. The process as claimed in claim 1, wherein the carrier has a volume of pores between 0.8 and 1.2 milliliters/gram.

4. The process as claimed in claim 1, wherein the palladium salt is palladium chloride or palladium acetate.

5. The process as claimed in claim 1, wherein the carrier is treated with the pure solvent and saturated therewith to a degree between about 50 and 80 percent.

6. The process as claimed in claim 1, wherein between about 0.1 and 10 weight percent of palladium is deposited on the carrier material.

7. The process as claimed in claim 6, wherein between 0.2 and 1 weight percent of palladium is deposited on the carrier.

8. The process as claimed in claim 1, wherein the carrier has a mean particle size of about 100 microns.

* * * * *